(12) United States Patent
Taniguchi

(10) Patent No.: US 6,432,186 B1
(45) Date of Patent: Aug. 13, 2002

(54) INK COMPOSITIONS FOR INK JET TEXTILE PRINTING

(75) Inventor: Makoto Taniguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/464,532

(22) Filed: Dec. 15, 1999

(30) Foreign Application Priority Data

| Dec. 17, 1998 | (JP) | 10-359148 |
| Sep. 8, 1999 | (JP) | 11-254824 |
| Dec. 10, 1999 | (JP) | 11-351406 |

(51) Int. Cl.$^7$ ............... C09D 11/00; C09D 11/02
(52) U.S. Cl. ............... 106/31.58; 106/31.43; 106/31.59
(58) Field of Search ............... 106/31.58, 31.43, 106/31.59

(56) References Cited

U.S. PATENT DOCUMENTS

| 4,702,742 A | * | 10/1987 | Iwata et al. ............... 8/495 |
| 5,180,425 A | * | 1/1993 | Matrick et al. ........... 106/31.58 |
| 5,356,464 A | * | 10/1994 | Hickman et al. ......... 106/31.36 |
| 5,360,472 A | * | 11/1994 | Radigan, Jr. et al. .... 106/31.51 |
| 5,395,434 A | * | 3/1995 | Tochihara et al. ....... 106/31.43 |
| 5,584,918 A | | 12/1996 | Suzuki et al. ............. 106/22 |
| 5,594,485 A | * | 1/1997 | Koike et al. .............. 347/101 |
| 5,603,756 A | * | 2/1997 | Suzuki et al. ............ 106/31.58 |
| 5,776,230 A | * | 7/1998 | Gundlach et al. ........ 106/31.43 |
| 5,910,211 A | * | 6/1999 | Ueda et al. ............... 106/31.43 |
| 5,952,414 A | * | 9/1999 | Noguchi et al. .......... 524/377 |

FOREIGN PATENT DOCUMENTS

| EP | 0605730 | 7/1994 | ............. D06P/3/00 |
| JP | 05186727 | 7/1993 | ........... C09D/11/00 |
| JP | 05239391 | 9/1993 | ........... C09D/11/00 |
| JP | 07173380 | 7/1995 | ........... C08L/71/02 |

OTHER PUBLICATIONS

JPO Abstract 05(1993)—186727, Jul. 27, 1993.
JPO Abstract 05(1993)—239391, Sep. 17, 1993.
JPO Abstract 07(1995)—173380, Jul. 11, 1995.

* cited by examiner

Primary Examiner—Helene Klemanski
Assistant Examiner—Veronica F. Faison
(74) Attorney, Agent, or Firm—Ladas & Parry

(57) ABSTRACT

An ink composition comprising at least a reactive dye, a surfactant, water, and at least one compound represented by formula (I), the composition having a viscosity of not more than 8.0 m.Pa.s (20° C.), is printed on a woven fabric by means of a piezoelectric type ink jet recording head:

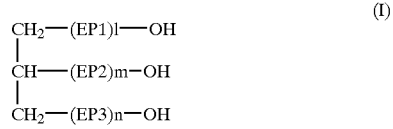

wherein EP1, EP2, and EP3 each independently represent an ethyleneoxy or propyleneoxy group; and l+m+n is a natural number of not less than 1.

27 Claims, 2 Drawing Sheets

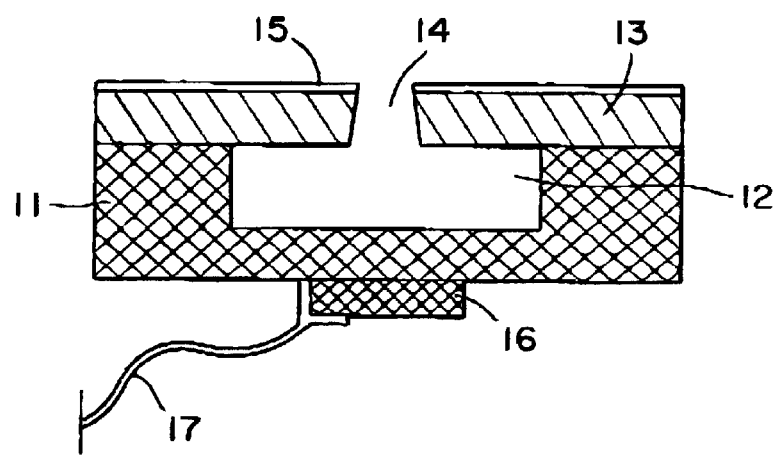
F I G. 1
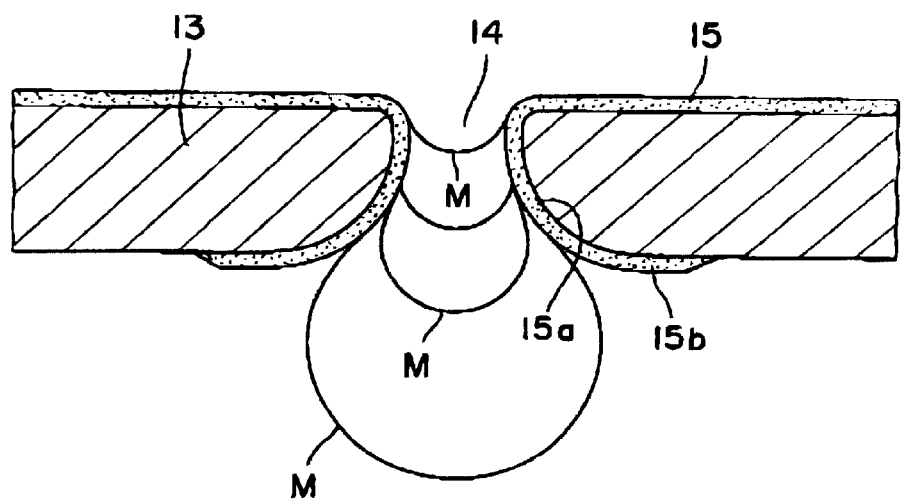
F I G. 2

INK COMPOSITIONS FOR INK JET TEXTILE PRINTING

BACKGROUND OF THE INVENTION

1. Field of the Invention

The present invention relates to an ink jet textile printing method wherein an ink composition is printed on a woven fabric by ink jet recording.

2. Background Art

Ink jet recording is a printing method wherein droplets. of an ink composition are ejected and deposited onto a recording medium such as paper. This method can realize an image having high resolution and quality at a high speed with a relatively inexpensive apparatus.

The application of the ink jet printing to textile permits various images to be easily formed on fabrics. This is particularly advantageous in the formation of images having excellent gradation, multicolor rendering and other properties. Further, unlike the conventional textile printing process, there is substantially no excessive ink composition. Therefore, the application of the ink jet printing to textile is advantageous from the viewpoint of the environmental protection.

Matters, which are important to the application of the ink jet recording to textile, include that the ink composition can realize highly color developed printed image; the ink composition can have viscosity low enough to be suitable for ink jet recording; the ink composition can favorably match a pretreatment agent for woven fabrics to realize good images; the drying of printed images is relatively fast and, for example, any offset does not occur at the time of winding of the woven fabric after textile printing; and the ink composition can be stored for a long period of time.

Ink jet textile printing methods are disclosed, for example, in Japanese Patent Laid-Open Nos. 186727/1993, 239391/1993, 145569/1994, 264018/1994, and 173780/1995.

SUMMARY OF THE INVENTION

The present inventor has now found ink compositions that can satisfy, on a high level, various properties required of ink compositions for ink jet textile printing and can realize good printed images.

Accordingly, it is an object of the present invention to provide ink compositions, which can satisfy, on a high level, various properties required of ink compositions for ink jet textile printing and can realize good printed images, and ink jet textile printing methods using the same.

According to a first aspect of the present invention, there is provided an ink composition for ink jet textile printing, comprising at least a reactive dye, a surfactant, water, and at least one compound represented by formula (I), said ink composition having a viscosity of not more than 8.0 m.Pa.s (20° C.):

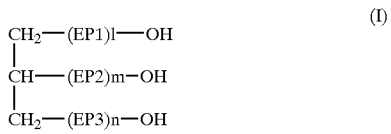

(I)

wherein
EP1, EP2, and EP3 each independently represent an ethyleneoxy or propyleneoxy group; and
l, m, and n independently represent 0 or a natural number of not less than 1, provided that at least one of l, m, and n represent 1 or more and the average of 1+m+n in the whole compound represented by formula (I) contained in the ink composition is 1 to 30.

According to a second aspect of the present invention, there is provided an ink composition for ink jet textile printing, comprising at least a monochlorotriazinyl derivative dye, an organic solvent having a boiling point of 150° C. or above at atmospheric pressure, a nonionic surfactant, and water, said ink composition having a pH value of 5.5 to 9.0 and a viscosity of not more than 8.0 m.Pa.s (20° C.).

The ink compositions according to the present invention can satisfy, on a high level, various properties required of ink compositions for ink jet textile printing. For example, the ink compositions according to the present invention can realize highly color developed printed images in textile printing. Further, the ink compositions according to the present invention are highly compatible with ink jet recording, especially a piezoelectric type ink jet recording head. Moreover, the ink compositions according to the present invention have an additional advantage that printed images are relatively fast drying. In the present invention, drying associated with the ink composition refers to the evaporation of volatile components in the ink composition to fix the solid component onto woven fabrics, and, in addition, connotes that, for example, the printed image becomes dry to the touch as a result of the penetration of the ink composition into woven fabrics. Moreover, the ink compositions according to the present invention have good long-term storage stability.

BRIEF DESCRIPTION OF THE DRAWINGS

FIG. 1 is a diagram showing one embodiment of an ink jet recording head which can favorably eject the ink composition of the present invention and comprises a member 11 defining an ink passage, an ink passage 12, a member 13 defining a face having an ink ejection port 14, an ink-repellent, surface-treated layer 15, composed of a codeposit of a fluoropolymer, provided on the surface of the member 13, a piezoelectric element 16, and a drive line 17 for driving the piezoelectric element;

FIG. 2 is a diagram showing a plate in another embodiment of the ink jet recording head which can favorably eject the ink composition according to the present invention and wherein a codeposit of the same type as the ink-repellent, surface-treated layer 15 is provided from the inner surface 15a to the back surface 15b of the ink ejection port 14.

DESCRIPTION OF THE PREFERRED EMBODIMENT

Figure 3:
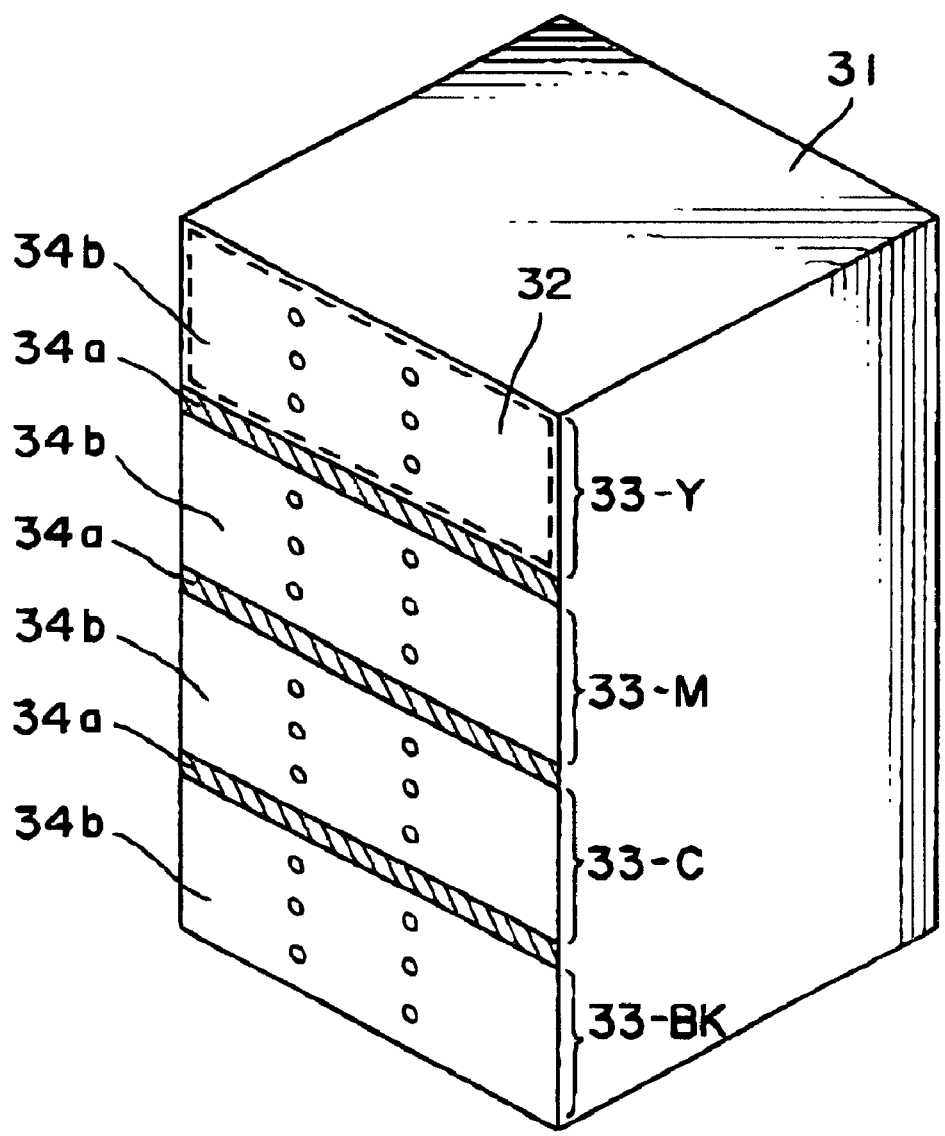
FIG. 3 is a diagram showing a further embodiment of the ink jet recording head which can favorably eject the ink composition according to the present invention and wherein either regions 34a between adjacent groups of nozzles or regions 34b within each group of nozzles have been treated for rendering the regions ink-repellent while the regions 34a or the regions 34b, which are not subjected to the treatment for rendering the regions ink-repellent, have been hydrophilified.

I. Ink Composition for Ink Jet Textile Printing According to First Aspect of Present Invention (1) Reactive dye According to the first aspect of the present invention, the reactive dye refers to a dye which, upon steaming, can be chemically bonded and fixed to woven fabrics. For example, the reactive dye refers to materials falling within the category of reactive dyes in the Colour Index (Soc. of Dyers and Colourists). According to a preferred embodiment of the present invention, reactive dyes have a reactive group, such as a monochlorotriazinyl, dichlorotriazinyl, chloropyrimidyl, vinylsulfone, or alkylsulfonic acid group. The selection of the reactive dye may be properly determined by taking various conditions into consideration. For example, when a high-density black color is particularly desired, the utilization of vinylsulfone dyes is preferred. on the other hand, when the long-term storage stability is important, the use of dyes having a monochlorotriazinyl skeleton, i.e., a monochloro-substituted 1,3,5-triazine-2-yl skeleton, is preferred. Reactive dyes having the monochlorotriazinyl skeleton have relatively good heat stability and thus are suitable for use in ink compositions for ink jet textile printing, which should be stably stored for a long period of time.

Specific examples of reactive dyes having a monochlorotriazinyl skeleton include:

C.I. Reactive Yellow 3,6,12, and 18;

C.I. Reactive Orange 2, 5, 13, and 20;

C.I. Reactive Red 3, 4, 7, 12, 13, 15, 16, 24, 29, 31, 32, 33, 43, 45, 46, 58, and 59;

C.I. Reactive Violet 1 and 2;

C.I. Reactive Blue 2, 3, 5, 7, 13, 14, 15, 25, 26, 39, 40, 41, and 46;

C.I. Reactive Green 5 and 8;

C.I. Reactive Brown 1, 2, 7, 8, 9, 11, and 14; and

C.I. Reactive black 1, 3, 8, 10, 12, and 13.

Specific examples; of preferred reactive dyes include Procion Yellow P-3R, Procion Red P-4BN, Procion Black P-2R, Procion Black P-N40, and Procion Blue P-5R.

In the ink composition according to the first aspect of the present invention, the amount of the reactive dye added may be properly determined. The amount of the reactive dye added, however, is preferably about 0.1 to 15% by weight, more preferably about 1 to 10% by weight, based on the ink composition.

According to a preferred embodiment of the present invention, the dye has been purified to such an extent that the content of a salt as an impurity derived from the dye contained in the ink composition is up to 1% by weight. The utilization of this purified dye can advantageously ensure a high level of ejection stability of the ink composition, and, in addition, can suppress rusting of the printer in its metal portions.

According to a preferred embodiment of the present invention, the ink composition according to the first aspect of the present invention may contain other colorants in addition to the reactive dye. In the case of printing on woven fabrics including fibers which are difficult to be dyed with the reactive dye, for example, blended woven fabrics, the use of an ink composition containing the reactive dye in combination with other colorant (s) can provide good printing. For example, for a woven fabric comprising a cotton and a polyester, printing using the ink composition according to the first aspect of the present invention, which further comprises a disperse dye, can offer good print quality. According to another preferred embodiment of the first aspect of the present invention, the use of an ink composition containing other colorant(s) in addition to the reactive dye can realize a wider range of color reproduction. For example, when textile printing is carried out on a pretreatment agent-coated silk, wool, or blended woven fabrics containing one of silk and wool, the addition of an acid dye to the ink composition can realize a wide range of color reproduction.

According to still another preferred embodiment of the present invention, the ink composition containing a reactive dye according to the first aspect of the present invention and an ink composition containing a disperse dye are separately provided, and ejected through separated ink jet recording heads. The order of ejection onto the woven fabric may be properly determined. Further, according to a preferred embodiment of the present invention, a plurality of ink compositions according to the present invention, which have the same color or similar colors, may be provided by varying the concentration or kind of the reactive dye and used for textile printing. In this embodiment, the gradation of printed images can be successfully improved. This embodiment has an additional advantage that the graininess of the intermediate to low density region can be relaxed.

(2) Compound represented by formula (I)

The ink composition for textile printing according to the first aspect of the present invention contains at least one compound represented by formula (I). According to the ink composition, compounds represented by formula (I) may be added alone or as a mixture of two or more. In formula (I), EP1, EP2, and EP3 each independently represent an ethyleneoxy or propyleneoxy group. Thus, both the ethyleneoxy group and the propyleneoxy group may exist in the same molecule. Alternatively, only any one of the ethyleneoxy group and the propyleneoxy group may exist in one molecule. l, m, and n independently represent 0 or a natural number of 1 or more, provided that at least one of l, m, and n represent 1 or more and the average of l+m+n in the whole compound represented by formula (I) contained in the ink composition is 1 to 30. The lower limit of l+m+n is preferably 2, and the upper limit thereof is 28. l+m+n is preferably in the range of 3 to 26. When l+m+n is in the above value range, the ink composition, even when printed after the ink composition is filled into a print head and, in this state, is allowed to stand for a long period of time, can be immediately stably ejected. Further, the viscosity of the ink composition can be easily modified.

The compound represented by formula (I) may be produced by providing preferably glycerin as a starting compound and adding a target molar amount of ethylene oxide and/or propylene oxide to the starting compound in an alkaline atmosphere or the like. This production process generally provides a mixture of compounds represented by formula (I). A single compound may be isolated by distillation or the like. In general, the use of compounds represented by formula (I) having a distribution in the number of ethyleneoxy groups added and the number of propyleneoxy groups added is preferred. This may improve the clogging preventive properties and the print quality.

Further, for the compound represented by formula (I), commercially available products may also be used, and examples thereof include Liponic EG-1 (a compound represented by formula (I) wherein EP1, EP2, and EP3 each represent an ethyleneoxy group and l+m+n is 26) and Liponic EG-7 (a compound represented by formula (I) wherein EP1, EP2, and EP3 each represent an ethyleneoxy group and l+m+n is 26) available from Lipo Chemicals Inc. (New Jersey, U.S.A.)

The addition of the compound represented by formula (I) can provide an ink composition which, when used in ink jet recording, can realize, on a high level, a combination of the prevention of clogging with good long-term storage stability. It is a well known fact that humectants are effective in preventing clogging of nozzles of the ink jet recording head.

Most of the humectants are characterized by being compounds having hydroxyl groups in their molecules and having a high boiling point. In these humectants, the moisture retention effect relies upon an increase in boiling point and a high level of hydrophilization through hydrogen bonds derived from hydroxyl groups. Since, however, the reactive dye is reacted with hydroxyl groups, the addition of the humectant is disadvantageous in the storage stability of the ink composition. On the other hand, when the humectant is not added to the ink composition, the ink composition, when used in ink jet recording, severely causes drying and clogging and thus is unsuitable for practical use. The addition of the compound represented by formula (I) can solve this problem. Without intending to be bound by theory, the reason, why this effect of the compound represented by formula (I) is attained, is believed as follows. The compound represented by formula (I) is an ethylene oxide or propylene oxide adduct of glycerin and has hydroxyl groups. By virtue of this structure, the above compound is considered to have a high level of hydrophilicity and a high boiling point and consequently to exhibit excellent moisture retention effect. This is advantageous from the viewpoint of clogging. Further, the incorporation of a plurality of compounds represented by formula (I) into the ink composition is more advantageous in clogging. On the other hand, since the number of hydroxyl groups per molecule in the compound represented by formula (I) is relatively small, it is considered that the reactivity of this compound with the reactive dye is so low that good storage stability is obtained.

The amount of the compound represented by formula (I) added to the ink composition may be properly determined so that the contemplated effect of the compound is attained or otherwise properties of the ink composition described below can be realized. The amount of the compound represented by formula (I) added, however, is preferably not less than 1% by weight and not more than 15% by weight. More preferably, the lower limit of the amount of the compound added is 3% by weight, and the upper limit of the amount of the compound added is 10% by weight.

(3) Other ingredients and properties of ink composition

The ink composition according to the first aspect of the present invention contains a surfactant. The addition of the surfactant enables uniform wetting of the surface of the pretreated woven fabric and can realize images having no significant printing spots. Further, this can realize an ink composition which can penetrate into a woven fabric in a short time. Furthermore, an ink composition can be realized which, when used in a piezoelectric vibration type ink jet recording head, can minimize the formation of bubbles, causative of ejection failure, within the print head to be discharged, and enables stable ejection.

Preferred surfactants include amphoteric surfactants, anionic surfactants, and nonionic surfactants. According to a preferred embodiment of the present invention, the surfactant is a nonionic surfactant. The surfactant can realize more stable ejection of the ink composition. Examples of preferred nonionic surfactants include ethylene glycol surfactants, polyhydric alcohol surfactants, and acetylene glycol surfactants. Among them, the utilization of acetylene glycol surfactants is preferred. Examples of preferred acetylene glycol surfactants include compounds represented by the following formula:

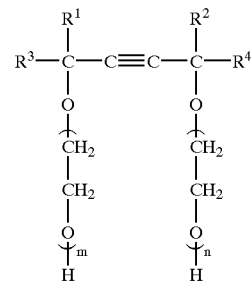

wherein $0 \leq m+n \leq 50$ and $R^1$, $R^2$, $R^3$, and $R^4$ each independently represent a $C_{1-6}$ alkyl group.

Commercially available products may be used as the compound represented by the above formula. Specific examples thereof include OLFINE Y, Surfynol 82, Surfynol 440, Surfynol 465, and Surfynol 485, (all the above products being manufactured by Air Products and Chemicals Inc.).

In a piezoelectric type ink jet recording head, the utilization of nonionic surfactants, preferably acetylene glycol surfactants, is advantageous because the amount of ink ejected per dot is stable to facilitate the reproduction of print density.

Further, the nonionic surfactant is effective in improving level dyeing ability and in preventing feathering or bleeding. In an ink composition for ink jet textile printing, which has much lower viscosity than the conventional printing paste used in a silk screen and the like, ink low generally occurs on woven fabrics, leading to a drawback that it is difficult to provide the level dyeing ability. This phenomenon is likely to occur particularly in the printing of a blotted image. In the present invention, the term "printing of a blotted image," used herein refers to the printing of a full density blotted block having an area of 5 mm×5 mm or a larger area. The ink flow is likely to cause color-to-color bleeding at the boundary of colors. The addition of the nonionic surfactant can advantageously prevent these drawbacks. In particular, the acetylene glycol surfactant, by virtue of its excellent capability of evenly wetting the pretreated woven fabric and penetration, can effectively prevent the creation of spots in the blotted image and feathering or bleeding.

The amount of the surfactant, particularly the nonionic surfactant, added may be properly determined so that the contemplated effect of the surfactant can be attained or otherwise the surface tension of the ink composition described below can be realized. The amount of the surfactant added, however, is preferably about 0.05 to 5% by weight, more preferably about 0.1 to 3% by weight, based on the ink composition.

Preferably, the ink composition according to the first aspect of the present invention is degassed before feed into a printer. The degassed ink composition facilitates the loading of the ink composition into the recording head, and, at the same time, can ensure the ejection stability of the ink and, upon cleaning operation, can easily return a nozzle, suffering from a failure to eject, to a normal state. These effects are more significant when the degassed ink composition is used with an ink jet recording head using a piezoelectric actuator. The ink composition can be degassed by any method without particular limitation. For example, allowing the ink composition to stand under reduced pressure can carry out the degas. This degassed ink composition is placed in a container, which can be substantially sealed off from the open air, for example, a cartridge or an aluminum pack, followed by hermetic sealing. This can keep the ink composition in a degassed state until the ink composition is loaded into the printer. The degree of degas is preferably not more than 10 ppm, more preferably not more than 5 ppm, in terms of the residual amount of nitrogen at 15° C.

According to a preferred embodiment of the present invention, the nonionic surfactant has a solubility of not less than 10 g/100 g in an organic solvent having a boiling point of 150° C. or above. The utilization of a nonionic surfactant and an organic solvent satisfying the above relationship is advantageous in that stable ejection of the ink composition from nozzles can be easily ensured under a high temperature environment (for example, at 35° C.). This effect is particularly advantageous in a piezoelectric type ink jet recording head.

According to a preferred embodiment of the present invention, the nonionic surfactant is added in combination with an alkylene glycol alkyl ether, a pyrrolidone solvent, or a thioglycol to the ink composition. This can advantageously realize stable ejection over a wide temperature range. The application of this preferred embodiment to an ink jet recording head using a piezoelectric actuator is particularly advantageous.

The main solvent of the ink composition according to the first aspect of the present invention is preferably water. Water may be pure water obtained by ion exchange, ultrafiltration, reverse osmosis, distillation or the like, or ultrapure water. Further, water, which has been. sterilized by ultraviolet irradiation or by addition of hydrogen peroxide or the like, is suitable because, when the ink composition is stored for a long period of time, it can prevent the occurrence and growth of mold or bacteria.

The ink composition according to the first aspect of the present invention may contain an organic solvent. The organic solvent is a polyhydric alcohol having a boiling point of 150° C. or above at atmospheric pressure. This organic solvent can effectively prevent the ink composition from drying and thus can prevent clogging of nozzles. Examples of preferred organic solvents include ethylene glycol, diethylene glycol, triethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,2-pentanediol, 1,5-pentanediol, 1,2-hexanediol, 1,6-hexanediol, 1,2,6-hexanetriol, 1,8-ocatanediol, 1,2-octanediol, glycerin, mesoerythritol, pentaerythritol, and thioglycol. Although the amount of the polyhydric alcohol organic solvent having a boiling point of 150° C. or above added may be properly determined, it is preferably not more than 50% by weight, more preferably 2 to 40% by weight, still more preferably about 2 to 20% by weight, based on the ink composition. These organic solvents may be used alone or as a mixture of two or more.

The ink composition according to the first aspect of the present invention preferably contains an alkylene glycol alkyl ether having a boiling point of 150° C. or above. This preferred embodiment can advantageously prevent the ink composition from drying in recording head nozzles. Further, the occurrence of air bubbles in the recording head can be prevented, and, even though air bubbles have been once created, the air bubbles can be rapidly allowed to disappear As a result, the ink composition can be stably ejected for a long period of time. This ejection stabilization effect is particularly advantageous in an ink jet recording method using an ink jet recording head provided with a piezoelectric actuator. The present inventors have further found that, when the ink composition with the alkylene glycol alkyl ether added thereto is used in combination with an ink jet recording head provided with a piezoelectric actuator, the amount of ink ejected can be reduced. Specifically, regulating the amount of the alkylene glycol alkyl ether added advantageously enables the amount of ink ejected to be easily brought to the optimal amount range of ink ejected in the recording head Alkylene glycol alkyl ethers having a boiling point of 150° C. or above include ethylene glycol monomethyl ether, ethylene glycol monoethyl ether, diethylene glycol monobutyl ether, triethylene glycol monomethyl ether, and triethylene glycol monobutyl ether. Among them, diethylene glycol monobutyl ether is particularly preferred. Although the amount of the alkylene glycol alkyl ether added may be properly determined, it is preferably about 0.5 to 30% by weight, more preferably about 3 to 20% by weight, still more preferably about 5 to 15% by weight, based on the ink composition. These organic solvents may be used alone or as a mixture of two or more.

In the ink composition according to the first aspect of the present invention, when the content of the reactive dye is relatively high, the incorporation of a pyrrolidone solvent to the ink composition is preferred from the viewpoint of improving the ejection stability. Examples of preferred pyrrolidone solvents include 2-pyrrolidone, N-methyl-2-pyrrolidone, and 1,3-dimethylimidazolidinone. Further, according to a preferred embodiment of the present invention, the combined use of the pyrrolidone solvent and the acetylene glycol surfactant described above can further improve the ejection stability. This effect is particularly significant when the above preferred embodiment is used in combination with a piezoelectric vibration type ink jet recording head.

It is a matter of course that, preferably, liquid organic components constituting the ink composition according to the first aspect of the present invention are substantially compatible with each other or one another. Here "substantially compatible" means that the ink composition does not cause phase separation and they have a solubility on such a level that precipitation does not occur. More preferably, "substantially compatible" means a compatibility on such a level that, upon the evaporation of water in the ink composition, phase separation does not occur between liquid components at room temperature. The ink composition having substantial compatibility can be more stably ejected.

According to a preferred embodiment of the present invention, the ink composition according to the first aspect of the present invention contains urea or a derivative thereof. Preferred examples of urea and urea derivatives include urea, dimethylurea, monomethylthiourea, thiourea, dimethylthiourea and other alkylureas and alkylthioureas. The urea or derivatives thereof can impart the effect of preventing clogging of nozzles to the ink composition and, at the same time, has hydrotrope effect. Further, the addition thereof can advantageously improve the textile print density. The addition of the thiourea is particularly effective in improving the level dyeing ability. Further, the addition of urea or derivatives thereof to the ink composition can reduce the amount of urea additives required in the pretreatment agent for woven fabrics, and, in some cases, can eliminate the need to add the urea additive. It can be said that reducing the amount of urea, which affects the environment, is favorable.

The amount of the urea or derivative thereof added may be properly determined so that the above contemplated effect is attained. Preferably, however, the lower limit of the amount thereof is 1% by weight, and the upper limit of the amount thereof is 15% by weight. More preferably, the lower limit of the amount thereof is 3% by weight, and the upper limit of the amount thereof is 10% by weight. According to a preferred embodiment of the present invention, urea or an alkylurea is added in an amount of 2 to 10% by weight in combination with 1 to 5% by weight of thiourea.

According to a preferred embodiment of the present invention, the ink composition according to the first aspect of the present invention contains a buffer. The ink composition is preferably adjusted to pH 6.0 to 9.0, more preferably pH 7.0 to 8.5. Adjusting the pH value of the ink composition to not more than 9.0 can delay the hydrolysis of the reactive dye, and thus can realize storage of the ink composition for a long period of time. The progress of the hydrolysis unfavorably lowers the fixation density of the woven fabric. Bringing the pH value of the ink composition to not less than 6.0 can advantageously delay the corrosion of the printing machine in its metallic portions. The addition of the buffer is preferred also from the fact that, even though the hydrolysis of the ink composition progresses, the pH value does not significantly vary and can be maintained in a proper range. The hydrolysis brings the ink composition to a highly acidic region. This sometimes disadvantageously causes unfavorable phenomena such as the corrosion of printing machines. In particular, the corrosion of the ink jet recording head portion severely damages the, ink jet system. However, when the ink composition is consumed in a short time after the production thereof or when the ink jet recording head has been subjected to corroding prevention treatment or the like, the utilization of ink compositions having a pH value of not less than 9.0 is also possible. Therefore, the ink compositions having a pH value of not less than 9.0 are not excluded from the present invention.

Examples of preferred buffers include sodium or potassium salts of 2-hydroxy-3-monopholinopropanesulfonic acid, N-cyclohexyl-3-aminopropanesulfonic acid (CAPS), N-cyclohexyl-2-aminoethanesulfonic acid, 2-[4-(2-hydroxyethyl)-1-piperazinyl]ethanesulfonic acid, N,N-bis-(2-hydroxyethyl)glycine, phosphoric acid, and tripolyphosphoric acid. According to a preferred embodiment of the present invention, the buffer is a phosphate buffer. These buffers can adjust the ink composition to a desired pH range by varying the amount of sodium and potassium.

Further, the ink composition according to the first aspect of the present invention preferably contains a sequestering agent. The addition of the sequestering agent can realize stable ejection of the ink composition for a long period of time. Further, the addition of the sequestering agent can provide an ink composition which can realize stable density and hue on woven fabrics. Examples of sequestering agents usable herein include ethyelenediaminetetraacetic acid (EDTA), EDTA salts, and hydroxyethylethylenediaminetriacetic acid (EDTA-OH). Although the amount of the sequestering agent added may be properly determined, it is preferably about 0.001 to 0.1% by weight, more preferably 0.005 to 0.03% by weight.

The ink composition according to the first aspect of the present invention may contain, in addition to the above ingredients, additives for improving various properties of the ink composition. An example of the additive is a preservative. Examples of preferred preservatives include Proxel CRL, Proxel BDN, Proxel GXL, Proxel XL-2, Proxel IB, and Proxel TN.

According to a preferred embodiment of the present invention, the ink composition according to the first aspect of the present invention contains a rust preventive agent. The addition of the rust preventive agent can prevent corrosion of printer members including a recording head and can realize stable ink jet textile printing for a long period of time. Examples of preferred rust preventive agents include benzotriazole. The amount of the rust preventive agent added is preferably about 0.005 to 0.05% by weight.

According to a preferred embodiment of the present invention, the viscosity at 20° C. of the ink composition according to the first aspect of the present invention is preferably brought to not more than 8.0 m.Pa.s, more preferably 1.5 to 6.0 m.Pa.s, particularly from the viewpoint of the ejection stability of the ink composition.

Further, according to a preferred embodiment of the present invention, the surface tension of the ink composition according to the first aspect of the present invention is preferably not more than 50 mN/m, more preferably 40 to 25 mN/m.

Preferably, the ink composition according to the first aspect of the present invention is degassed before feed into a printer. The degassed ink composition facilitates the loading of the ink composition into the recording head, and, at the same time, can ensure the ejection stability of the ink and, upon cleaning operation, can easily return a nozzle, suffering from a failure to eject, to a normal state. These effects are more significant when the degassed ink composition is used with an ink jet recording head using a piezoelectric actuator. The ink composition can be degassed by any method without particular limitation. For example, allowing the ink composition to stand under reduced pressure can carry out the degas. This degassed ink composition is placed in a container, which can be substantially sealed off from the open air, for example, a cartridge or an aluminum pack, followed by hermetic sealing. This can keep the ink composition in a degassed state until the ink composition is loaded into a printer. The degree of degas is preferably not more than 10 ppm, more preferably not more than 5 ppm, in terms of the residual amount of nitrogen at 15° C.

II. Ink Composition for Ink Jet Textile Printing According to Second Aspect of Present Invention The ink composition according to the second aspect of the present invention contains a monochlorotriazinyl derivative dye as a colorant. Examples of preferred monochlorotriazinyl derivatives dye include those described above in connection with the ink composition according to the first aspect of the present invention.

In the ink composition according to the second aspect of the present invention, although the amount of the dye added may be properly determined, it is preferably about 0.1 to 15% by weight, more preferably about 0.5 to 10% by weight, based on the ink composition.

According to a preferred embodiment of the present invention, the dye has been purified to such an extent that the content of a salt as an impurity derived from the dye contained in the ink composition is up to 1% by weight. The utilization of this purified dye can advantageously ensure a high level of ejection stability of the ink composition, and, in addition, can suppress rusting of the printer in its metal portions.

In the ink composition according to the second aspect of the present invention, an organic solvent having a boiling point of 150° C. or above at atmospheric pressure is used as an organic solvent. The utilization of this organic solvent can advantageously prevent the ink composition from drying and thus can prevent clogging of nozzles. Examples of organic solvents usable herein include hydroxyl-containing organic solvents, such as ethylene glycol, diethylene glycol, glycerin, and thioglycol. More specific examples thereof include ethylene glycol methyl ether, ethylene glycol ethyl ether, diethylene glycol butyl ether, triethylene glycol dimethyl ether and other alkylene glycol alkyl ethers. According to a preferred embodiment of the present invention, the alkylene glycol alkyl ether is added because the effect of stably ejecting the ink composition through nozzles is significant.

Although the amount of the organic solvent having a boiling point of 150° C. or above added may be properly determined, it is preferably about 5 to 50% by weight, more preferably about 10 to 40% by weight, based on the ink composition.

It is a matter of course that, preferably, the organic solvent as the solvent is substantially compatible with the ingredients constituting the ink composition. Here "substantially compatible" means that the ink composition does not cause phase separation and the solubility is on such a level that precipitation does not occur. More preferably, "substantially compatible" means a solubility on such a level that, upon drying, phase separation does not occur between liquid components at room temperature.

The ink composition according to the second aspect of the present invention further contains a nonionic surfactant. The addition of the nonionic surfactant can provide an ink composition having excellent ejection stability. Further, the time required in the penetration of the ink composition into the woven fabric can be advantageously shortened, resulting in the application of the ink composition to the woven fabric in a short time.

Examples of preferred nonionic surfactants include ethylene glycol surfactants, polyhydric alcohol surfactants, and acetylene glycol surfactants. According to a preferred embodiment of the present invention, the utilization of the acetylene glycol surfactant is preferred. Examples of preferred acetylene glycol surfactants include compounds represented by the general formula described above in connection with the ink composition according to the first aspect of the present invention OLFINE Y, Surfynol 82, Surfynol 440, Surfynol 465, and Surfynol 485 are particularly preferred.

Although the amount of the nonionic surfactant added may be properly determined, it is preferably about 0.05 to 5% by weight, more preferably about 0.1 to 3% by weight, based on the ink composition.

In a preferred embodiment of the ink composition according to the second aspect of the present invention, the nonionic surfactant has a solubility of not less than 10 g/100 g in an organic solvent having a boiling point of 150° C. or above. The utilization of a nonionic surfactant and an organic solvent satisfying the above relationship is advantageous in that stable ejection of the ink composition from nozzles can be ensured under a high temperature environment (for example, at 35° C.).

In the ink composition according to the second aspect of the present invention, water constitutes a main solvent. Water may be pure water obtained by ion exchange, ultrafiltration, reverse osmosis, distillation or the like, or ultrapure water. Further, water, which has been sterilized by ultraviolet irradiation or by addition of hydrogen peroxide or the like, is suitable because, when the ink composition is stored for a long period of time, it can prevent the occurrence and growth of mold or bacteria.

The pH value of the ink composition according to the second aspect of the present invention is brought to 5.5 to 9.0 (preferably 6.0 to 8.0), and the viscosity thereof is brought to not more than 8.0 m.Pa.s (at 20° C.), preferably not more than 5 m.Pa.s. Preferably, the above pH value is realized by the addition of a buffer, and the above viscosity value is realized by the addition of a hydrotrope.

Examples of preferred buffers include those described above in connection with the ink composition according to the first aspect of the present invention. Thus, examples thereof include sodium or potassium salts of 2-hydroxy-3-monopholinopropanesulfonic acid, N-cyclohexyl-3-aminopropanesulfonic acid (CAPS), N-cyclohexyl-2-aminoethanesulfonic acid, 2-[4-(2-hydroxyethyl)-1-piperazinyl]ethanesulfonic acid, N,N-bis-(2-hydroxyethyl) glycine, phosphoric acid, and tripolyphosphoric acid. According to a preferred embodiment of the present invention, the buffer is a phosphate buffer. These buffers can adjust the ink composition to a desired pH range by varying the amount of sodium and potassium.

Examples of preferred hydrotropes include those described above in connection with the ink composition according to the first aspect of the present invention. Thus, examples thereof include urea, dimethylurea, thiourea, monomethylthiourea, dimethylthiourea, and dicyandiamide. According to a preferred embodiment of the present invention, urea and dicyandiamide are added in combination as the hydrotrope. The utilization of urea in combination with dicyandiamide can reduce the necessary amount of urea added. It can be said that reducing the amount of urea, which affects the environment, is favorable. This preferred embodiment has an additional advantage that, despite the reduction in the amount of urea added, the addition of urea in combination with dicyandiamide can realize good images.

The ink composition according to the second aspect of the present invention may contain, in addition to the above ingredients, additives for improving various properties of the ink composition An example of the additive is a preservative. Examples of preferred preservatives include Proxel CRL, Proxel BDN, Proxel GXL, Proxel XL-2, Proxel IB, and Proxel TN.

According to a preferred embodiment of the present invention, the ink composition according to the second aspect of the present invention contains a rust preventive agent. The addition of the rust preventive agent can prevent corrosion of printer members including a recording head and can realize stable ink jet textile printing for a long period of time. Examples of preferred rust preventive agents include benzotriazole. The amount of the rust preventive agent added is preferably about 0.005 to 0.05% by weight.

III. Ink Jet Textile Printing Method (1) Ink jet textile printing using ink composition according to first aspect of present invention.

Woven fabrics, to which the ink composition according to the first aspect of the present invention can be favorably applied, include those composed mainly of vegetable fibers, animal fibers, or amide fibers. Preferred examples of woven fabrics include cotton, hemp, wool, silk, viscose rayon, cuprammonium rayon, polynosic, Vinylon, nylon, wood fibers, such as tencel, and blended fabrics containing at least one of the above fibers.

Preferably, these woven fabrics are treated with a pretreatment agent before the application of the ink composition thereto. Preferred pretreatment agents are those containing a sizing agents. Preferred examples thereof include those containing naturally occurring gums, such as guar gum and locust bean gum, starches, sodium alginate, seaweeds, such as glue plants, barks or skins of plants, such as pectinic acid, cellulose derivatives, such as methylcellulose, ethylcellulose, hydroxyethylcellulose, and carboxymethylcellulose, chemically modified starches, such as roast starch, alpha starch, carboxymethyl starch, carboxyethyl starch, and hydroxyethyl starch, processed naturally occurring rubbers, alginic acid derivatives, and synthetic sizing agents or emulsions of polyvinyl alcohol, polyacrylic esters and the like. Sizing agents having poor dyeability with the reactive dye are particularly preferred.

The addition of a hydrotrope to the pretreatment agent for woven fabrics, to which the ink composition according to the first aspect of the present invention is applied, is preferred. Hydrotropes usable herein include urea and alkylureas, such as dimethylurea, thiourea, monomethylthiourea, and dimethylthiourea. The addition of the hydrotrope can advantageously improve the print density. When urea is added in combination with an alkylurea and thiourea, the necessary amount of urea added can be reduced. The addition of the hydrotrope can improve the stability of the pretreatment agent and, in addition, has the effect of effectively preventing cracking in the fabric subjected to padding. The utilization of the thiourea as the hydrotrope is particularly preferred from the viewpoint of improving the level dyeing ability. The addition of the hydrotrope to the ink composition can reduce the necessary amount of the hydrotrope added to the pretreatment agent, and, in some cases, can eliminate the need to add the hydrotrope to the pretreatment agent. It can be said that reducing the amount of urea, which affects the environment, is favorable. Although the amount of the hydrotrope to the pretreatment agent added may be suitably determined, it is preferably not more than 15% by weight, more preferably not more than 10% by weight.

The pretreatment agent may be coated onto a woven fabric by any conventional method, for example, by padding. In this case, the mangle pressure, the speed, the drying time, etc. may be suitably determined. The pickup in the padding is preferably about 40 to 90%, more preferably about 60 to 80%. Increasing the pickup can generally improve the fixation density.

The ink composition according to the first aspect of the present invention is deposited onto the woven fabric by means of an ink jet recording device described below. According to a preferred embodiment of the present invention, the density of the ink ejected is preferably not less than 120 dots/inch, and, in the case of the printing of blotted images, the amount of the ink deposited is preferably not less than 5 g/m$^2$, from the viewpoint of reducing the graininess of printed images to realize high-density images.

The woven fabric with the ink composition deposited thereon is preferably post-treated to accelerate the fixation of the reactive dye onto the fibers and, thereafter, to satisfactorily remove the colorant and other ink ingredients remaining unfixed and the pretreatment agent. According to a preferred embodiment of the present invention, the post-treatment is divided into several steps. At the outset, preferably, after the ink composition is deposited onto the woven fabric, this woven fabric is allowed to stand at room temperature to 150° C. for 0.5 to 30 min to predry the deposited ink composition This predrying can improve the print density and can effectively prevent feathering or bleeding. The predrying connotes the penetration of the ink composition into the woven fabric.

According to a preferred embodiment of the present invention, the predrying may be carried out by continuous heat drying. In this case, the woven fabric in a roll form is fed to an ink jet textile printing machine, printed, and then passed into the step of drying before the printed woven fabric is wound. The dryer may be connected directly to the textile printing machine, or alternatively may be provided separately from the textile printing machine. The drying in the dryer is preferably carried out at a temperature of 150° C. or below for 0.5 to 30 min. Preferred drying methods include air convection, heat roll direct mounting, and irradiation methods.

Preferably, the predried woven fabric is steamed. The steaming may be carried out under conditions which have been determined by taking into consideration the type of the woven fabric and the like. Preferably, however, the steaming is carried out by placing the predried woven fabric in an environment of humidity 50 to 100% (more preferably humidity 80 to 100%) and temperature 90 to 120° C. (preferably 95 to 105° C.) for 3 to 120 min (preferably 5 to 40 min). Preferably, the steamed woven fabric is then washed with a surfactant-containing warm water. The printed woven fabric post-treated in this way has excellent color development and fastness properties and has no significant feathering or bleeding of the ink.

(2) Ink jet textile printing using ink composition according to second aspect of present invention Woven fabrics, to which the ink composition according to the second aspect of the present invention can be favorably applied, include those described above in connection with the ink composition according to the first aspect of the present invention.

Also in the ink jet textile printing method using the ink composition according to the second aspect of the present invention, preferably, pretreatment and post-treatment are carried out in the same manner as described above in connection with the ink composition according to the first aspect of the present invention Pretreatment and post-treatment, which are preferred in combination with the ink composition according to the second aspect of the present invention, will be described.

According to the ink jet textile printing method using the ink composition according to the second aspect of the present invention, the following treatment is preferably carried out before the ink composition is applied to the woven fabric. According to a preferred embodiment of the present invention, the pretreatment agent is carried out by previously coating a pretreatment containing a sizing agent, an alkalifying agent, a quaternary ammonium salt or a quaternary amine salt, and a hydrotrope onto the woven fabric. According to a preferred embodiment of the present invention, the sizing agent is at least one member selected from the group consisting of carboxymethylcellulose, locust bean gum, chemically modified starches, sodium alginate, peptin, and carboxymethyl ether. Examples of preferred alkalifying agents include sodium bicarbonate, sodium carbonate, sodium hydrogencarbonate, and sodium oxalate. Examples of preferred quaternary amine salts include polyarylamines and quaternized salts thereof, polyvinylamines and quaternized salts thereof, and polycations. Examples of hydrotropes include those described above in connection with the hydrotrope added to the ink composition. Also in the pretreatment agent, the hydrotrope preferably contains both urea and dicyandiamide.

The pretreatment agent may be coated by any conventional method. For example, padding may be used for the coating. In this case, the mangle pressure, the speed, the drying time, etc. may be properly determined. According to a preferred embodiment of the present invention, the squeezing pressure in the padding is preferably about 40 to 90%, more preferably about 60 to 80%.

The woven fabric with the ink composition deposited thereon is preferably post-treated to accelerate the reaction of the dye, contained in the ink composition, with the cellulosic fiber and, thereafter, to remove the colorant and other ingredients remaining unfixed. According to a preferred embodiment of the present invention, the. step of post-treatment comprises: subjecting the woven fabric with the ink composition deposited thereon to a fixation treatment wherein the woven fabric is placed in an environment of humidity 50 to 100% (preferably humidity 80 to 100%) and temperature 90 to 110° C. (preferably 95 to 105° C.) for 4 to 25 min (preferably 6 to 20 min); and then washing the treated woven fabric with warm water containing at least an anionic surfactant or a nonionic surfactant.

Preferably, conditions for this post-treatment are varied according to the type of the woven fabric used. Varying the fixation time is particularly preferred. For example, when the woven fabric is cotton, the fixation time is preferably about 6 to 12 min. On the other hand, when the woven fabric is silk, the fixation time is preferably about 10 to 20 min.

(3) Ink jet recording apparatus

Textile printing using the ink composition according to the first or second aspect of the present invention is carried out by an ink jet recording apparatus. The ink jet recording apparatus may be any of the so-called "piezoelectric head type ink jet recording apparatus" wherein ink droplets are formed by mechanically changing the volume of a piezoelectric element, and then ejected, and the so-called "bubble jet type or thermal jet type ink jet recording apparatus" wherein a thermal energy is applied to an ink composition to cause volume expansion through which ink droplets are formed and ejected.

The ink compositions according to the first and second aspect of the present invention can be very advantageously used in an ink jet recording method using a piezoelectric element. Piezoelectric ink jet recording heads have very good durability and thus are particularly preferred in applications where the ink composition should be stably ejected for a long period of time, such as textile printing. The ink compositions according to the present invention have very good compatibility with the piezoelectric ink jet recording head, and can realize stable continuous ejection over a wide temperature range for a long period of time. This is very advantageous in printing of continuous woven fabrics, where enormous amounts of inks should be ejected, and is the greatest advantages obtained by the present invention.

According to a preferred embodiment of the present invention, the ink compositions according to the present invention are used with an ink jet recording head having a nozzle plate of which the surface layer portion has been treated for rendering the material ink-repellent. The combination of the ink compositions according to the present invention with the ink jet recording head subjected to the treatment for rendering the material ink-repellent can reduce the ink droplet trajectory directionality problem and thus can print good images on woven fabrics. According to a preferred embodiment of the present invention, the inner surface of the nozzle holes (that is, ink ejection port) has also been treated for rendering the material ink-repellent. The additional treatment of the inner surface of the nozzle hole for rendering the material ink-repellent can stabilize the position of meniscus of the ink composition and consequently can further improve the ejection stability. Further, the treatment for rendering the material ink-repellent can advantageously make it difficult for the ink composition to be, deposited onto the nozzle plate surface, and hence can retain the ink repellency of the nozzle surface for a longer period of time.

The material for the nozzle plate of the ink jet recording head, through which the ink compositions of the present invention are ejected, is not particularly limited. Preferred materials include metals, ceramics, silicon, glass, and plastics. More preferred are single metals, such as titanium, chromium, iron, cobalt, nickel, copper, zinc, tin, and gold, alloys, such as nickel-phosphorus alloy, tin-copper-phosphorus alloy, copperzinc alloy, and stainless steel, polycarbonate, polysulfone, acrylonitrile-butadiene-styrene copolymer, polyethylene terephthalate, polysulfone, and various photosensitive resins.

The treatment for rendering the nozzle plate ink-repellent may be carried out by any method without particular limitation. Preferably, however, the treatment is carried out by codeposition. The codeposition may be carried out, for example, by immersing a plate member in a liquid containing metal ions and particles of a water-repellent polymeric resin dispersed by charges, and forming an ink-repellent layer on the surface of the nozzle plate while stirring. Water-repellent polymeric resin materials usable herein include resins, such as polytetrafluoroethylene, polyperfluoroalkoxybutadiene, polyfluorovinylidene, polyfluorovinyl, and polydiperfluoroalkyl fumarate. These resins may be used alone or as a mixture of two or more. Metal ions usable herein include nickel, copper, silver, tin, and zinc ions. Preferred are materials having high surface hardness and excellent abrasion resistance, such as nickel, nickel-cobalt alloy, and nickel-boron alloy.

Specific examples of the ink jet recording head, which can favorably eject the ink compositions according to the present invention, include heads described in Japanese Patent Laid-Open Nos. 339656/1992 and 339662/1992, which are incorporated herein by reference. More specifically, as shown in FIG. 1, an ink-repellent layer composed of a codeposit of a fluoropolymer formed by electrolysis is provided on the outer surface of a nozzle plate having an ink ejection port. FIG. 1 is a cross-sectional schematic view of this ink jet recording head The ink jet recording head comprises at least a member 11 defining an ink passage, an ink passage 12, a member 13 defining a face having an ink ejection port 14, an ink-repellent, surface-treated layer 15, composed of a codeposit of a fluoropolymer, provided on the surface of the member 13, and piezoelectric element 16, and a drive line 17 for driving the piezoelectric element. The surface-treated layer 15 can realize stable ejection of the ink composition.

Another specific example of the ink jet recording head, which can favorably eject the ink compositions according to the present invention, is a head described in Japanese Patent Laid-Open No. 116327/1993, which is incorporated herein by reference. More specifically, in a recording head having a nozzle plate as shown in FIG. 2, an ink-repellent coating is evenly provided on the surface of the nozzle plate, the inner surface of a nozzle hole extending to this nozzle plate surface, and the peripheral portion of the nozzle hole extending to the backside of the nozzle plate. FIG. 2 is a diagram showing an ink ejection port and its vicinity in a nozzle plate. This nozzle plate corresponds to the member 13 shown in FIG. 1, and the other construction may be the same as that shown in FIG. 1. In this recording head, the same codeposit as used in the ink-repellent surface-treated layer 15 is provided from the inner surface 15a to the back surface 15b of the ink ejection port 14. This construction is advantageous in that, for example, even though meniscuses of the ink composition indicated by M in the drawing are greatly vibrated by a pressure fluctuation or the like within an ink chamber and greatly retreated toward the ink chamber, the meniscuses can still stably have the spherical surface, permitting a record to be written at a high frequency without causing any ink droplet trajectory directionality problem, dropouts of dots and the like.

A further specific example of the ink jet recording head, which can favorably eject the ink compositions according to the present invention, is a head described in Japanese Patent Laid-open No. 122210/1994, which is incorporated herein by reference. More specifically, as shown in FIG. 3, in a print head 31, each group of nozzles 33-Y, 33-M, 33-C, and 33-BK, wherein nozzles for ejecting the ink composition of the same color are perpendicularly arranged on a nozzle face 32, are arranged in a direction perpendicular to the printing scanning direction. On the nozzle face 32, either regions 34*a* between adjacent groups of nozzles or regions 34*b* within each group of nozzles have been treated for rendering the regions ink-repellent, for example, to bring the contact angle of the treated region with the ink composition to not less than 80 degrees, while the regions 34*a* or the regions 34*b*, which are not subjected to the treatment for rendering the regions ink-repellent, have been hydrophilified, for example, to bring the contact angle of the treated region with the ink composition to not more than 30 degrees. When the regions 34*a* between adjacent groups of nozzles are hydrophilified and, at the same time, the regions 34*b* within each group of nozzles are treated for rendering the regions ink-repellent, the ink composition is repelled in the periphery of the nozzles and is dragged into the nozzles. Therefore, uneven wetting of the periphery of the nozzles 3 by the ink composition does not occur, and this can ensure stable ejection of the ink composition. The ink composition, which has not been dragged into the nozzles, is held in the regions, between adjacent groups of nozzles, which have been hydrophilified. This can prevent color mixing between adjacent inks. Conversely, when the regions 34*a* between adjacent groups of nozzles are treated for rendering the regions ink-repellent and, at the same time, the regions 34*b* within each group of nozzles are hydrophilified, the ink composition is spread due to wetting in the periphery of the nozzles, ensuring stable ejection of the ink by virtue of even wetting of the periphery of the nozzles by the ink. The ink composition, which has been spread to between adjacent groups of nozzles, is repelled by the regions 34*b*, between adjacent groups of nozzles, which have been treated for rendering the regions 34*b* ink-repellent. This can prevent color mixing between adjacent inks.

EXAMPLES

Example A

Preparation of ink compositions

Ink A1 was prepared according to the following procedure. A 10 wt % aqueous solution (5 g) of Surfynol 465, 2.5 g of a 10 wt % aqueous solution of a preservative Proxel XL, 2 g of a 1 wt. % aqueous solution of sodium tripolyphosphate, and 0.5 g of a 1 wt % aqueous solution of a chelating agent EPDA were added to a 110-cc sample bottle while stirring with a magnetic stirrer, followed by the addition of 10 g of Liponic EG-1. Further, 70 g of a 10 wt % aqueous solution of Procion Yellow P-3R was added thereto. Finally, 10 g of water was added to bring the total weight of the solution to 100 g. The mixture was stirred for 10 min by means of a magnetic stirrer to prepare an ink composition.

| Ink A1 | |
|---|---|
| Procion Yellow P-3R | 7 wt % |
| Liponic EG-1 | 10 wt % |
| Surfynol 465 | 0.5 wt % |
| Sodium tripolyphosphate | 0.02 wt % |
| Proxel XL | 0.25 wt % |
| EPDA | 0.005 wt % |
| Benzotriazole | 0.001 wt % |
| Water | Balance |

Inks A2 to A7 having the following compositions were prepared in the same manner as used in ink A1.

| Ink A2 | |
|---|---|
| Procion Red P-4BN | 7 wt % |
| Liponic EG-7 | 7 wt % |
| Diethylene glycol | 7 wt % |
| Triethylene glycol mono-n-butyl ether | 3 wt % |
| Surfynol 465 | 0.7 wt % |
| CAPS | 0.02 wt % |
| Preservative | 0.2 wt % |
| Chelating agent | 0.01 wt % |
| Water | Balance |

| Ink A3 | |
|---|---|
| Procion Black P-2R | 10 wt % |
| Compound of formula (I) wherein EP1, EP2, and EP3 each represent an ethyleneoxy group and 1 + m + n is 3 | 5 wt % |
| 2-Pyrrolidone | 5 wt % |
| Surfynol 465 | 0.9 wt % |
| Sodium phosphate | 0.08 wt % |
| Preservative | 0.15 wt % |
| Chelating agent | 0.015 wt % |
| Water | Balance |

| Ink A4 | |
|---|---|
| Procion Black P-N40 | 8 wt % |
| Compound of formula (I) wherein EP1, EP2, and EP3 each represent an ethyleneoxy group and 1 + m + n is 7 | 10 wt % |
| Diethylene glycol | 5 wt % |
| Surfynol 485 | 1.1 wt % |
| Sodium polyphosphate | 0.05 wt % |
| Preservative | 0.1 wt % |
| Chelating agent | 0.02 wt % |
| Water | Balance |

| Ink A5 | |
|---|---|
| Procion Blue P-5R | 6 wt % |
| Compound of formula (I) wherein EP1, EP2, and EP3 each represent an propyleneoxy group and 1 + m + n is 3 | 15 wt % |
| Thiodiglycol | 10 wt % |
| Surfynol 485 | 1.3 wt % |
| Sodium tripolyphosphate | 0.1 wt % |
| Preservative | 0.05 wt % |
| Chelating agent | 0.025 wt % |
| Water | Balance |

| Ink A6 | |
|---|---|
| Procion Red P-4BN | 7 wt % |
| Liponic EG-7 | 7 wt % |
| Triethylene glycol mono-n-butyl ether | 3 wt % |
| Urea | 7 wt % |
| Surfynol 465 | 0.7 wt % |
| CAPS | 0.02 wt % |
| Preservative | 0.2 wt % |
| Chelating agent | 0.01 wt % |
| Water | Balance |

| Ink A7 | |
|---|---|
| C.I. Reactive Black 3 | 8 wt % |
| Liponic EG-7 | 10 wt % |
| Surfynol 465 | 0.7 wt % |
| CAPS | 0.02 wt % |
| Preservative | 0.2 wt % |
| Chelating agent | 0.01 wt % |
| Water | Balance |

| Ink A8 | |
|---|---|
| C.I. Reactive Red 45 | 8 wt % |
| Compound of formula (I) wherein EP1, EP2, and EP3 each represent an ethyleneoxy group and 1 + m + n is 10 | 10 wt % |
| Surfynol 465 | 0.7 wt % |
| CAPS | 0.02 wt % |
| Preservative | 0.2 wt % |
| Chelating agent | 0.01 wt % |
| Water | Balance |

Pretreatment agent for woven fabric

Alginic acid (tradename: Kimitsu Algine B3) (15 g) was added to 1 liter of water with slow stirring over a period of about 4 hr. Further 15 g of dicyandiamide was added thereto with stirring. The mixture was allowed to stand for one day. After the absence of any undissolved lump was confirmed, 2.5 g of a quaternary polyamine and 25 g of sodium bicarbonate were added thereto to prepare pretreatment agent A1.

Pretreatment agent A2 was prepared in the same manner as used in the preparation of pretreatment agent A1, except that urea was used instead of dicyandiamide. Further, pretreatment agent A3 was prepared in the same manner as used in the preparation of pretreatment agent A1, except that 5 g of dicyandiamide, 5 g of urea, and 5 g of water were used instead of 15 g of dicyandiamide.

Padding

Padding of the pretreatment agent was carried out at room temperature by using HVF 350 manufactured by Matisse. More specifically, a cotton fabric, which had been previously cut into a size of 210 mm×315 mm, was subjected to padding under conditions of pressure 2 bar, speed 3 m/min, and pickup 80%.

Ink jet textile printing

A modified ink jet printer MJ 930C (manufactured by Seiko Epson Corporation) was filled with an ink composition, and textile printing was then carried out on the cotton fabric which had been subjected to padding of the pretreatment agent. In this case, a nozzle plate and a part of nozzle holes in the printer were those that had been subjected to codeposition of nickel and Teflon to render the material ink-repellent.

Post-treatment

Fixation was carried out by means of a steamer Model DHe manufactured by Matisse under conditions of temperature 102° C., humidity not less than 98%, and steaming time 8 min.

The fixation was followed by washing. Specifically, the fabric was then rinsed with tap water while rubbing, and warm water was gradually added to the tap water. The fabric was immersed for 15 min in a rising water (95° C.) containing anionic surfactants (sodium higher alcohol sulfate and sodium alkylbenzenesulfonate) and a nonionic surfactant (polyethylene glycol) with occasional stirring. The bath ratio was 1/50. The fabric was then hand rinsed with rubbing while introducing tap water into the rising liquid. After thorough rising with water, the fabric was dried and then ironed to prepare a printed fabric.

Evaluation test A1

Textile printing was carried out for combinations of ink compositions and pretreatment agents shown in the following table. The OD value of the printed portion was measured on the printed fabrics thus obtained. The results were as follows.

| Ink composition | Pretreatment agent | OD value |
| --- | --- | --- |
| Ink A4 | Pretreatment agent A1 | 1.43 |
| Ink A4 | Pretreatment agent A2 | 1.45 |
| Ink A4 | Pretreatment agent A3 | 1.47 |

Evaluation test A2

Immediately after the preparation of the ink composition, textile printing was carried out in the same manner as used in evaluation test A1. Separately, after the preparation of the ink composition, the ink composition was allowed to stand at a temperature of 50° C. for one week, and then used to carry out textile printing in the same manner as used in evaluation test A1. The OD value of the printed portion was measured on the printed fabric using the ink composition before standing and the printed fabric using the ink composition after standing. The results were as summarized in the following table. In evaluation test A2, pretreatment agent A2 was used as a pretreatment agent in combination with all the ink compositions.

| Ink composition | OD value before standing | OD value after standing |
| --- | --- | --- |
| Ink A1 | 1.37 | 1.37 |
| Ink A2 | 1.39 | 1.37 |
| Ink A3 | 1.48 | 1.48 |
| Ink A4 | 1.45 | 1.44 |
| Ink A5 | 1.35 | 1.34 |
| Ink A6 | 1.38 | 1.36 |
| Ink A7 | 1.39 | 1.39 |
| Ink A8 | 1.40 | 1.40 |

Evaluation test A3

Evaluation test A3 was carried out in the same manner used in evaluation test A2, except that the standing temperature was changed to 60° C. The results were as summarized in the following table.

| Ink composition | OD value before standing | OD value after standing |
| --- | --- | --- |
| Ink A1 | 1.37 | 1.36 |
| Ink A2 | 1.39 | 1.36 |
| Ink A3 | 1.48 | 1.48 |
| Ink A4 | 1.45 | 1.43 |
| Ink A5 | 1.35 | 1.33 |
| Ink A6 | 1.38 | 1.33 |
| Ink A7 | 1.39 | 1.38 |
| Ink A8 | 1.40 | 1.39 |

Evaluation test A4

An ink jet printer MJ 930C was filled with ink A1, and printing was then carried out. In this case, ink droplets could be ejected from all nozzles of the recording head without any droplet trajectory directionality problem. This printer was then allowed to stand at 40° C. for 7 days, followed by printing without use of the cleaning function provided in the printer. As a result, ink droplets could be ejected from all the nozzles without any droplet trajectory directionality problem.

Evaluation test A5

An ink jet printer MJ 930C, provided with a head not subjected to any treatment for rendering the material ink-repellent, was filled with ink A1, and printing was then carried out. In this case, ink droplets could be ejected from all nozzles of the recording head without any droplet trajectory directionality problem. This printer was then allowed to stand at 40° C. for 7 days, followed by printing without any cleaning operation. As a result, ink droplets could be ejected from all the nozzles with a deviation of the ink droplet trajectory direction of about 5% from the normal droplet trajectory direction. Textile printing was then carried out on a woven fabric which had been treated with pretreatment agent A1, followed by predetermined fixation and rinsing. The printed image was visually inspected. As a result, it was found that there was no problem associated with the droplet trajectory directionality and the printed image had high quality.

After the printer was allowed to stand at 40° C. for 7 days, the print head was once subjected to cleaning operation. As a result, the droplet trajectory directionality problem was eliminated. Thereafter, printing was carried out on 100 sheets of paper of size A4. In this printing, any unfavorable phenomenon did not occur.

Evaluation test A6

An ink jet printer MJ 930C was filled with ink A2, followed by printing on 20,000 sheets of recording paper of size A4 at environmental temperatures of 0° C., 20° C., and 40° C. As a result, ink droplets could be ejected from all the nozzles at all the environmental temperatures, and no droplet trajectory directionality problem occurred.

Evaluation test A7

The ink jet printer MJ 930C, provided with a nozzle plate not subjected to any treatment for rendering the material ink-repellent, used in evaluation test A5 was filled with ink A2. Printing was then carried out on 20,000 sheets of recording paper of size A4 at environmental temperatures of 0° C., 20° C., and 40° C. As a result, ink droplets could be ejected from all the nozzles at all the environmental temperatures. A droplet trajectory directionality problem occurred in several nozzles after printing on about 3,000 sheets of paper at 40° C.

Textile printing was then carried out using this head on the pretreated fabric described above, followed by fixation. As a result, any problem associated with the droplet trajectory directionality was not visually observed in the printed image. It is considered that slight blurring of the ink on the fabric upon steaming has made a deterioration in image by a deviation of the ink droplet trajectory direction from the normal ink droplet trajectory direction negligible.

Inks A9 to A11 having the following compositions were prepared in the same manner as used in ink A1.

| Ink A9 | |
|---|---|
| Procion Black P-2R | 5 wt % |
| Liponic EG-7 | 3 wt % |
| Diethylene glycol | 10 wt % |
| Surfynol 465 | 0.7 wt % |
| CAPS | 0.02 wt % |
| Preservative | 0.2 wt % |
| Chelating agent | 0.01 wt % |
| Benzotriazole | 0.01 wt % |
| Water | Balance |
| Ink A10 | |
| Procion Black P-2R | 5 wt % |
| Liponic EG-7 | 3 wt % |
| Diethylene glycol mono-n-butyl ether | 2 wt % |
| Diethylene glycol | 8 wt % |
| Surfynol 465 | 0.7 wt % |
| CAPS | 0.02 wt % |
| Preservative | 0.2 wt % |
| Chelating agent | 0.01 wt % |
| Benzotriazole | 0.01 wt % |
| Water | Balance |
| Ink A11 | |
| Procion Black P-2R | 5 wt % |
| Liponic EG-7 | 3 wt % |
| Diethylene glycol mono-n-butyl ether | 4 wt % |
| Diethylene glycol | 6 wt % |

-continued

| | |
|---|---|
| Surfynol 465 | 0.7 wt % |
| CAPS | 0.02 wt % |
| Preservative | 0.2 wt % |
| Chelating agent | 0.01 wt % |
| Benzotriazole | 0.01 wt % |
| Water | Balance |

A modified ink jet printer MJ 930C was filled with inks A9 to A11 prepared above, and these inks were ejected at room temperature. In this case, the amount of the ink per droplet was measured. The results are shown in the following table.

| Ink | A9 | A10 | A11 |
|---|---|---|---|
| Amount ejected, pl/dot | 48 | 44 | 41 |

Example B

Preparation of ink compositions

Ink B1 having the following composition was prepared according to the following procedure. A 10 wt % aqueous solution (5 g) of Surfynol 465, 2.5 g of a 10 wt % aqueous solution of a preservative Proxel XL, 2 g of a 1 wt % aqueous solution of sodium tripolyphosphate, and 0.5 g of a 1 wt % aqueous solution of a chelating agent EPDA were added to a 110-cc sample bottle while stirring with a magnetic stirrer. Further, 10 g of diethylene glycol, 10 g of triethylene glycol, 10 g of glycerin, and 5 g of diethylene glycol mono-n-butyl ether was added thereto, followed by the addition of 50 g of a 10 wt % aqueous solution of Procion Yellow P-3R. Finally, 5 g of water was added to bring the total weight of the solution to 100 g. The mixture was stirred for 10 min by means of a magnetic stirrer to prepare an ink composition.

| Ink B1 | |
|---|---|
| Procion Yellow P-3R | 5 wt % |
| Diethylene glycol | 10 wt % |
| Triethylene glycol | 10 wt % |
| Glycerin | 10 wt % |
| Diethylene glycol mono-n-butyl ether | 5 wt % |
| Surfynol 465 | 0.5 wt % |
| Sodium tripolyphosphate | 0.02 wt % |
| Preservative | 0.25 wt % |
| Chelating agent | 0.005 wt % |
| Water | Balance |

Inks B2 to B5 having the following compositions were prepared in the same manner as used in ink B1.

| Ink B2 | |
|---|---|
| Procion Red P-4BN | 5 wt % |
| Diethylene glycol | 20 wt % |
| Diethylene glycol mono-n-butyl ether | 15 wt % |
| Surfynol 465 | 0.7 wt % |
| CAPS | 0.02 wt % |
| Preservative | 0.2 wt % |
| Chelating agent | 0.01 wt % |
| water | Balance |

-continued

| Ink B3 | |
|---|---|
| Procion Black P-2R | 4 wt % |
| Triethylene glycol | 10 wt % |
| Glycerin | 10 wt % |
| Diethylene glycol mono-n-butyl ether | 5 wt % |
| Surfynol 465 | 0.9 wt % |
| Sodium phosphate | 0.08 wt % |
| Preservative | 0.15 wt % |
| Chelating agent | 0.015 wt % |
| Water | Balance |
| Ink B4 | |
| Procion Black P-N40 | 6 wt % |
| Triethylene glycol | 15 wt % |
| Diethylene glycol mono-n-butyl ether | 5 wt % |
| Surfynol 485 | 1.1 wt % |
| Sodium polyphosphate | 0.05 wt % |
| Preservative | 0.1 wt % |
| Chelating agent | 0.02 wt % |
| Water | Balance |
| Ink B5 | |
| Procion Blue P-5R | 4 wt % |
| Diethylene glycol | 15 wt % |
| Triethylene glycol | 10 wt % |
| Diethylene glycol mono-n-butyl ether | 10 wt % |
| Surfynol 485 | 1.3 wt % |
| Sodium tripolyphosphate | 0.1 wt % |
| Preservative | 0.05 wt % |
| Chelating agent | 0.025 wt % |
| Water | Balance |

Pretreatment agent for woven fabric

Alginic acid (tradename: Kimitsu Algine B3) (15 g) was added to 1 liter of water with slow stirring over a period of about 4 hr. Further, 15 g of dicyandiamide was added thereto with stirring. The mixture was allowed to stand for one day. After the absence of any undissolved lump was confirmed, 2.5 g of a quaternary polyamine and 25 g of sodium bicarbonate were added thereto to prepare pretreatment agent B1.

Pretreatment agent B2 was prepared in the same manner as used in the preparation of pretreatment agent B1, except that urea was used instead of dicyandiamide. Further, pretreatment agent B3 was prepared in the same manner as used in the preparation of pretreatment agent B1, except that 5 g of dicyandiamide, 5 g of urea, and 5 g of water were used instead of 15 g of dicyandiamide.

Padding

Padding of the pretreatment agent was carried out at room temperature by using HVF 350 manufactured by Matisse. More specifically, a cotton fabric, which had been previously cut into a size of 210 mm×315 mm, was subjected to padding under conditions of pressure 2 bar, speed 3 m/min, and pickup 98%.

Ink jet textile printing

Textile printing was carried out by means of an ink jet printer MJ 930C (manufactured by Seiko Epson Corporation) on the cotton fabric which had been subjected to padding of the pretreatment agent.

Post-treatment

Fixation was carried out by means of a steamer Model DHe manufactured by Matisse under conditions of temperature 102° C., humidity 99%, and steaming time 8 min.

Washing followed the fixation. Specifically, the fabric was then rinsed with tap water while rubbing, and warm water was gradually added to the tap water. The fabric was then immersed for 15 min in a rising water (95° C.) containing anionic surfactants (sodium higher alcohol sulfate and sodium alkylbenzenesulfonate) and a nonionic surfactant (polyethylene glycol) with occasional stirring. The fabric was then hand rinsed with rubbing while introducing tap water into the rising liquid. The fabric was dried and then ironed to prepare a printed fabric.

Evaluation test B1

Textile printing was carried out for combinations of ink compositions and pretreatment agents shown in the following table. The OD value of the printed portion was measured on the printed fabrics thus obtained. The results were as summarized in the following table.

| Ink composition | Pretreatment agent | OD value |
|---|---|---|
| Ink B4 | Pretreatment agent B1 | 1.25 |
| Ink B4 | Pretreatment agent B2 | 1.27 |
| Ink B4 | Pretreatment agent B3 | 1.30 |

Evaluation test B2

Immediately after the preparation of the ink composition, textile printing was carried out in the same manner as used in evaluation test B1 to prepare a printed fabric. Separately, after the preparation of the ink composition, the ink composition was allowed to stand at a temperature of 50° C. for one week, and then used to carry out textile printing in the same manner as used in evaluation test B1 to prepare a printed fabric. The OD value of the printed portion was measured on the printed fabric using the ink composition before standing and the printed fabric using the ink composition after standing. The results were as summarized in the following table. In evaluation test B2, pretreatment agent B1 was used as a pretreatment agent in combination with all the ink compositions.

| Ink composition | OD value before standing | OD value after standing |
|---|---|---|
| Ink B1 | 1.18 | 1.18 |
| Ink B2 | 1.22 | 1.20 |
| Ink B3 | 1.24 | 1.24 |
| Ink B4 | 1.25 | 1.24 |
| Ink B5 | 1.30 | 1.28 |

Evaluation test B3

An ink jet printer MJ 930C was filled with ink B1, followed by printing. As a result, no failure to eject ink droplets attributable to bubbles was observed, and ink droplets were ejected from all the nozzles of the recording head.

Evaluation test B4

The ink jet printer MJ 930C was filled with ink B2, followed by printing on 2,000 sheets of recording paper of size A4 at environmental temperatures of 0° C., 20° C., and 40° C. As a result, for all the temperatures, good printing could be carried out without any failure to eject ink droplets.

Inks B6 to B8 having the following compositions were prepared in the same manner as used in ink B1.

| Ink B6 | |
|---|---|
| Procion Black P-N40 | 6 wt % |
| Triethylene glycol | 10 wt % |
| Glycerin | 5 wt % |
| Surfynol 485 | 1.1 wt % |

-continued

| | |
|---|---|
| Sodium polyphosphate | 0.05 wt % |
| Preservative | 0.1 wt % |
| Chelating agent | 0.02 wt % |
| Benzotriazole | 0.02 wt % |
| Water | Balance |
| Ink B7 | |
| Procion Black P-N40 | 6 wt % |
| Triethylene glycol | 10 wt % |
| Glycerin | 3 wt % |
| Triethylene glycol mono-n-butyl ether | 2 wt % |
| Surfynol 485 | 1.1 wt % |
| Sodium polyphosphate | 0.05 wt % |
| Preservative | 0.1 wt % |
| Chelating agent | 0.02 wt % |
| Benzotriazole | 0.02 wt % |
| Water | Balance |
| Ink B8 | |
| Procion Black P-N40 | 6 wt % |
| Triethylene glycol | 8 wt % |
| Glycerin | 3 wt % |
| Triethylene glycol mono-n-butyl ether | 4 wt % |
| Surfynol 485 | 1.1 wt % |
| Sodium polyphosphate | 0.05 wt % |
| Preservative | 0.1 wt % |
| Chelating agent | 0.02 wt % |
| Benzotriazole | 0.02 wt % |
| Water | Balance |

A modified ink jet printer MJ 930C was filled with inks B6 to B8 prepared above, and these inks were ejected at room temperature. In this case, the amount of the ink per droplet was measured. The results are shown in the following table.

| Ink | B6 | B7 | B8 |
|---|---|---|---|
| Amount ejected, pl/dot | 50 | 45 | 41 |

What is claimed is:

1. An ink composition for ink jet textile printing, comprising a reactive dye, a surfactant, water, at least one member selected from the group consisting of urea, thiourea, alkyl-substituted urea, and alkylthioureas, and at least one compound represented by formula (I), said ink composition having a viscosity of not more than 8.0 m.Pa.s (20° C.):

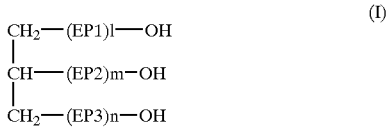

wherein
EP1, EP2, and EP3 each independently represent an ethyleneoxy or propyleneoxy group; and
l, m, and n, independently represent 0 or a natural number of not less than 1, provided that at least one of l, m, and n represent 1 or more and the average of 1+m+n in the whole compound represented by formula (I) contained in the ink composition is 1 to 30.

2. The ink composition according to claim 1, wherein the reactive dye is a monochlorotriazinyl derivative dye.

3. The ink composition according to claim 1, which has a surface tension of not more than 50 mN/m.

4. The ink composition according to claim 1, which comprises a polyhydric alcohol and/or an alkylene glycol alkyl ether having a boiling point of 150° C. or above.

5. The ink composition according to claim 1, wherein the surfactant is an acetylene glycol derivative.

6. An ink composition for ink jet textile printing, comprising a monochlorotriazinyl derivative dye, an organic solvent having a boiling point of 150° C. or above at atmospheric pressure, a nonionic surfactant, and water, said ink composition having a pH value of 5.5 to 9.0 and a viscosity of not more than 8.0 m.Pa.s (20° C.) and further comprising both urea and dicyandiamide.

7. The ink composition according to claim 6, which further comprises at least one member selected from the group consisting of thiourea, alkyl-substituted ureas and cyanamide compounds.

8. The ink composition according to claim 6, wherein the organic solvent having a boiling point of 150° C. or above is an alkylene glycol alkyl ether.

9. The ink composition according to claim 6, wherein the nonionic surfactant is an acetylene glycol derivative.

10. The ink composition according claim 6, which further comprises benzotriazole as a rust preventive agent.

11. An ink jet textile printing method comprising the steps of: ejecting ink droplets of an ink composition; and depositing the ink droplets onto a woven fabric including a cellulosic fiber,
said ink composition being one according to claim 1,
said woven fabric having been previously coated with a pretreatment agent comprising a sizing agent, an alkalifying agent, a quaternary ammonium salt or a quaternary amine salt, and a hydrotrope, wherein both urea and dicyandiamide are contained as the hydrotrope contained in the ink composition and/or the pretreatment agent.

12. The method according to claim 1, wherein after the ink composition is deposited onto the woven fabric and the woven fabric is then allowed to stand in an environment of humidity 50 to 100% and temperature 90 to 110° C. for 4 to 25 min to perform fixation treatment and is then washed with warm water containing at least an anionic surfactant or a nonionic surfactant.

13. An ink jet textile printing method comprising the steps of: ejecting ink droplets of an ink composition; and depositing the ink droplets onto a woven fabric,
said ink composition being one according to claim 1,
said ink droplets being ejected by means of an ink jet recording head using a piezoelectric actuator.

14. The method according to claim 13, wherein an ink-repellent layer is provided on the surface of a nozzle plate of the ink jet recording head.

15. The method according to claim 14, wherein the ink-repellent layer is provided also on the inner surface of nozzle holes.

16. The method according to claim 15, wherein the ink-repellent layer has been formed by codeposition.

17. A woven fabric printed by the ink jet textile printing method according claim 11.

18. The ink composition according to claim 1, wherein the reactive dye is present in the ink composition in an amount of about 0.1 to 15% by weight and the compound represented by formula (I) is present in the ink composition in an amount effective to help prevent the ink composition from clogging an ink jet nozzle during ink jet printing without detriment to a long-term storage stability of the ink composition.

19. The ink composition according to claim 18, wherein the dye is present in the ink composition in an amount of about 1 to 10% by weight and the compound of formula (I) is present in the ink composition in an amount of about 3–10% by weight.

20. An ink jet textile printing method comprising the steps of: ejecting ink droplets of an ink composition; and depositing the ink droplets onto a woven fabric including a cellulosic fiber, said ink composition comprising a monochlorotriazinyl derivative dye, an organic solvent having a boiling point of 150° C. or above at atmospheric pressure, a nonionic surfactant, and water, said ink composition having a pH value of 5.5 to 9.0 and a viscosity of not more than 8.0 m.Pa.s (20° C.), said woven fabric having been previously coated with a pretreatment agent comprising a sizing agent, an alkalifying agent, a quaternary ammonium salt or a quaternary amine salt, and a hydrotrope, wherein both urea and dicyandiamide are contained as the hydrotrope contained in the ink composition and/or the pretreatment agent.

21. The method according to claim 20, wherein after the ink composition is deposited onto the woven fabric and the woven fabric is then allowed to stand in an environment of humidity 50 to 100% and temperature 90° C. to 110° C. for 4 to 25 min to perform fixation treatment and is then washed with warm water containing at least an anionic surfactant or a nonionic surfactant.

22. An ink jet textile printing method comprising the steps of: ejecting ink droplets of an ink composition; and depositing the ink droplets onto a woven fabric, said ink composition comprising a monochlorotriazinyl derivative dye, an organic solvent having a boiling point of 150° C. or above at atmospheric pressure, a nonionic surfactant, and water, said ink composition having a pH value of 5.5 to 9.0 and a viscosity of not more than 8.0 m.Pa.s (20° C.), said ink droplets being ejected by means of an ink jet recording head using a piezoelectric actuator and having a nozzle plate which has an ink-repellent layer provided its surface.

23. The method according to claim 22, wherein the ink-repellent layer is provided also on the inner surface of nozzle holes.

24. The method according to claim 22, wherein the ink-repellent layer has been formed by codeposition.

25. A woven fabric printed by the ink jet textile printing method according to claim 20.

26. A woven fabric printed by the ink jet textile printing method according to claim 22.

27. A woven fabric printed by the ink jet textile printing method according to claim 13.

* * * * *